(12) United States Patent  
Ong et al.

(10) Patent No.: US 7,981,563 B2
(45) Date of Patent: Jul. 19, 2011

(54) DIRECT CARBON FUEL CELL WITH PRE-WETTED CARBON PARTICLES

(75) Inventors: Estela T. Ong, Chicago, IL (US); Kevin Krist, Palatine, IL (US); Chakravarthy Sishtla, Woodridge, IL (US)

(73) Assignee: Gas Technology Institute, Des Plaines, IL (US)

( * ) Notice: Subject to any disclaimer, the term of this patent is extended or adjusted under 35 U.S.C. 154(b) by 904 days.

(21) Appl. No.: 11/986,767

(22) Filed: Nov. 26, 2007

(65) Prior Publication Data

US 2009/0136797 A1    May 28, 2009

(51) Int. Cl.
*H01M 8/22* (2006.01)
*H01M 4/96* (2006.01)

(52) U.S. Cl. .......................... 429/478; 429/505; 429/535

(58) Field of Classification Search ................... None
See application file for complete search history.

(56) References Cited

U.S. PATENT DOCUMENTS

| 4,643,954 | A | * | 2/1987 | Smith | 429/432 |
| 4,963,442 | A | * | 10/1990 | Marianowski et al. | 429/460 |
| 2003/0017380 | A1 | * | 1/2003 | Cooper et al. | 429/46 |
| 2004/0229109 | A1 | * | 11/2004 | Cooper et al. | 429/40 |

OTHER PUBLICATIONS

Cooper, J. F., "Direct Conversion of Coal-Derived Carbon in Fuel Cells", *Recent Trends in Fuel Science and Technology*, ed. S. Basu, Springer, 2007, pp. 248-266.
Cooper, J. F., "Direct Conversion of Coal-Derived Carbon in Fuel Cells", UCRL—PROC-202196, 2004, pp. 1-38.

* cited by examiner

*Primary Examiner* — Keith Walker
(74) *Attorney, Agent, or Firm* — Mark E. Fejer

(57) ABSTRACT

A direct carbon fuel cell having an anode electrode of carbon particles pre-wetted with carbonate, a cathode electrode, and an electrolyte layer disposed between the anode electrode and the cathode electrode and containing a molten carbonate. The fuel cell includes a wicking feature whereby excess carbonate produced during the operation of the fuel cell is removed. The use of carbonate pre-wetted carbon particles as the anode provides a network of empty voids, facilitating the removal of $CO_2$ gas from the cell, thereby enhancing fuel cell performance.

20 Claims, 5 Drawing Sheets

Anode Reactions: $C + 2CO_3^= \rightarrow 3CO_2 + 4e^-$
$CO + CO_3^= \rightarrow 2CO_2 + 2e^-$ Cathode Reaction: $2CO_2 + O_2 + 4e^- \rightarrow 2CO_3^=$ Overall Cell Reaction: $C + O_2 \rightarrow CO_2$
$CO + 1/2 O_2 \rightarrow CO_2$

DIRECT CARBON FUEL CELL WITH PRE-WETTED CARBON PARTICLES

BACKGROUND OF THE INVENTION

1. Field of the Invention

This invention relates to fuel cells and, in particular, to fuel cells which directly convert solid carbon fuels such as coal, petroleum coke, pyrolyzed biomass, and organic wastes into electricity. This invention further relates to fuel cells which utilize molten carbonate as an electrolyte.

2. Discussion of Related Art

Whereas a conventional fuel cell converts gaseous hydrogen-based fuels into electricity, a direct carbon fuel cell (DCFC) uses solid carbon fuel to electrochemically generate electricity. The reactions involved are:

Anodic reaction: $C + 2CO_3^= = 3CO_2 + 4e^-$

Cathodic reaction: $O_2 + 2CO_2 + 4e^- = 2CO_3^=$

Overall reaction: $C + O_2 = CO_2$

Like any fuel cell, direct carbon fuel cells are not limited by the Carnot cycle efficiency. The direct conversion of carbon to electricity is governed by the free energy change of the reaction. The conversion efficiency is the ratio of the free energy of the reaction at the operating temperature to the standard enthalpy:

Thermodynamic efficiency = $\Delta G_T / \Delta H°_{298} = \Delta H - T\Delta S$ Since $\Delta S$ for the carbon oxidation reaction is nearly zero, the thermodynamic efficiency is nearly 100% and is nearly independent of temperature.

Another feature of the direct carbon fuel cell is that the activity of carbon, because it is solid, and the $CO_2$ product, because it is undiluted, is unity and invariant. This allows complete utilization of the fuel. Furthermore, the $CO_2$ product in the anode exhaust gas is pure and, therefore, may be readily disposed of or recovered.

Molten carbonate fuel cells are fuel cells comprising an anode electrode, a cathode electrode and a molten carbonate electrolyte, typically a combination of alkali carbonates, which is usually retained within a porous electrolyte matrix such as $LiAlO_2$, disposed between the anode and cathode electrodes. These fuel cells operate at temperatures in the range of about 600° C. to about 700° C. at which temperatures the alkali carbonates form a highly conductive molten salt, with carbonate ions providing ionic conduction. At the high operating temperatures of molten carbonate fuel cells, Ni (anode) and nickel oxide (cathode) catalysts are adequate to promote reaction.

The Boudouard reaction is the redox reaction of a chemical equilibrium mixture of carbon monoxide and carbon dioxide in a given temperature. It is the disproportionation of carbon monoxide into carbon dioxide and graphite or its reverse $2CO = CO_2 + C$ The Boudouard reaction implies that at lower temperatures the equilibrium is on the exothermic carbon dioxide side and at higher temperatures the endothermic formation of carbon monoxide is the dominant product. For instance, in the high-temperature, reducing environment of a smokestack, carbon monoxide is the stable product. When the carbon monoxide reaches the cooler air at the top of the smokestack, the Boudouard reaction takes place, oxidizing the carbon monoxide to form carbon dioxide, and precipitating (reducing) the graphite to produce soot.

The use of molten carbonate fuel cells to directly convert carbon to electricity is known. See, for example, Cooper, J. F., "Direct Conversion of Coal-Derived Carbon in Fuel Cells", *Recent Trends in Fuel Science and Technology*, ed. S. Basu, Springer, 2007, pp 248-266, and Cooper, J. F., "Direct Conversion of Coal-Derived Carbon in Fuel Cells", UCRL-PROC-202196, 2004, pp 1-38. In these known fuel cells, $CO_2$ gas is used to pneumatically introduce coal or other carbon material into the fuel cell. The $CO_2$ is maintained at temperatures less than about 500° C. so that it does not react with the carbon fuel. The fuel cell is oriented in a slanting position and the carbon is immersed in molten carbonate. However, because the molten carbonate fuel cell matrix and cathode performance depend on an optimal carbonate filling based upon their pore structures and carbonate inventory, immersing the coal in a carbonate bath as taught by the Cooper reference would flood the matrix and the cathode, and, thus, yield poor performance. In addition, because the carbon is immersed in carbonate melt, the $CO_2$ product in the anode must bubble through the melt to exit the fuel cell.

SUMMARY OF THE INVENTION

It is, thus, one object of this invention to provide a direct carbon fuel cell which addresses the limitations of known direct carbon fuel cells as discussed herein above.

The invention disclosed and claimed herein is a direct carbon fuel cell which is based upon the chemistry of a molten carbonate fuel cell and, as such, employs a molten carbonate electrolyte disposed within a porous electrolyte matrix, a Li-doped NiO or other known cathode, and an anode modified to accommodate the carbon fuel. The active components of a direct carbon fuel cell in accordance with one embodiment of this invention comprise an anode electrode comprising carbon particles pre-wetted with carbonate, a cathode electrode, and a porous electrolyte matrix disposed between the anode electrode and the cathode electrode and containing a molten carbonate which is maintained within the porous network of the matrix by virtue of capillarity. The carbon particles are randomly packed so as to form a porous network. The active components are sandwiched between two metal flanges, which form reactant chambers that contain the reactants in the electrodes. When the fuel cell is disposed within a stack of fuel cells, the metal flanges function as separator plates, separating the anode electrode of one fuel cell from the cathode electrode of an adjacent fuel cell.

It will be appreciated by those skilled in the art that the operation of the direct carbon fuel cell of this invention will result in the generation of excess carbonate which must be removed to avoid the performance problems of conventional direct carbon fuel cells. To enable removal of the excess carbonate, in accordance with one embodiment of this invention, the porous electrolyte matrix extends beyond the periphery of the metal flanges and is connected with a wicking material which is suitable for adsorbing or draining the excess carbonate. In accordance with one embodiment of this invention, the wicking material is melt adsorbent by means of capillary action. In accordance with one embodiment of this invention, the wicking material is a ceramic felt made of alumina or $LiAlO_2$. In accordance with another embodiment of this invention, the wicking material is a metal foam such as steel, which acts as a drain for the melt. Melt dripping from the wicking material may be collected by any suitable means.

Depending upon material constraints, contrary to the conventional direct carbon fuel cells which operate at temperatures less than about 500° C. to avoid the reaction of carbon and carbon dioxide, the direct carbon fuel cell of this invention is operable at temperatures in the range of about 600° C. to about 950° C.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

Figure 1:
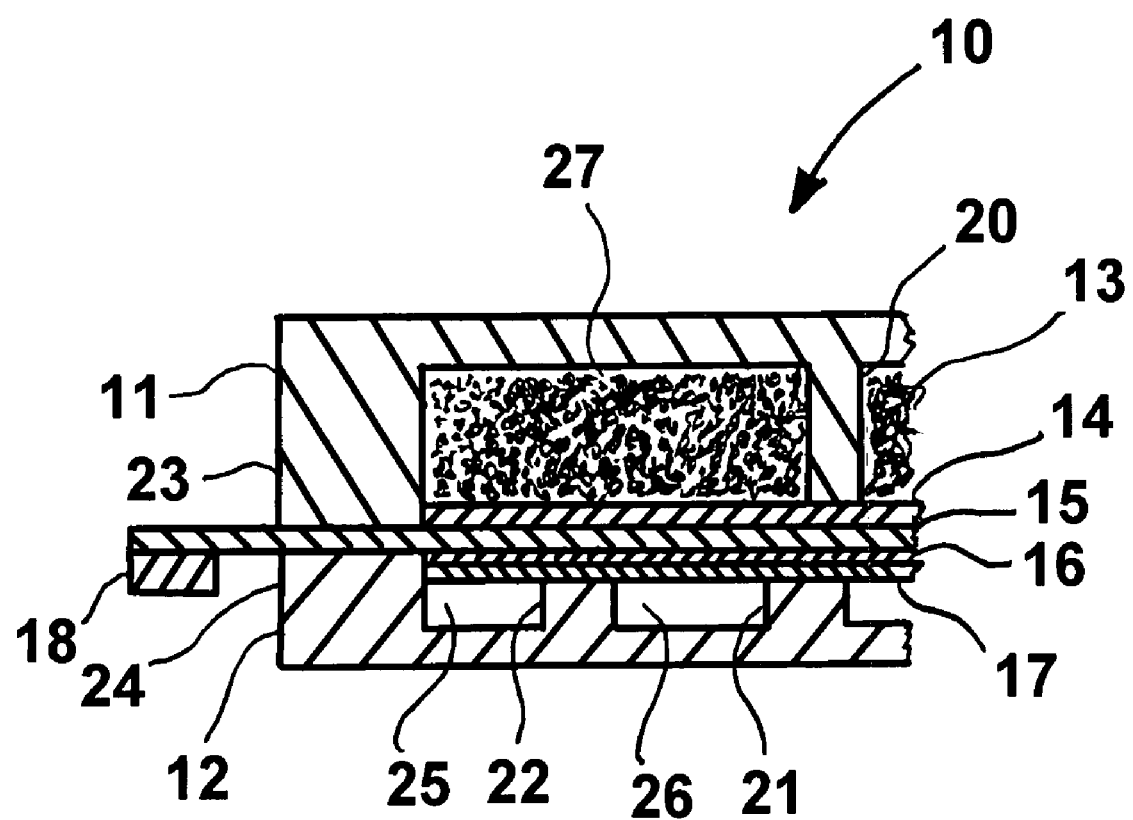
FIG. 1 is a lateral cross-sectional view of a peripheral region of a direct carbon fuel cell in accordance with one embodiment of this invention.

The direct carbon fuel cell 10 in accordance with one embodiment of this invention as shown in FIG. 1 comprises a fuel cell unit, i.e. anode electrode 13, cathode electrode 16, and electrolyte layer 15 between the anode and cathode electrodes, all of which are sandwiched between two metal flanges having a centralized active region and a peripheral sealing region, an anode flange 11 and a cathode flange 12, which house the reactants in the electrodes. The metal flanges may be comprised of suitable materials providing desired physical strength and reactant separation. For example, the metal flanges may be fabricated from ferrous alloys, such as type 300 series stainless steel. A portion of the electrolyte layer extends beyond the periphery of the metal flanges.

The peripheral sealing region of each metal flange comprises a raised peripheral wet seal structure 23, 24 which extends to contact the electrolyte layer, forming a peripheral wet seal with the electrolyte layer 15 around the periphery of the metal flanges. An exemplary molten carbonate fuel cell having wet seal structures is described, for example, in U.S. Pat. No. 4,963,442, which is incorporated herein by reference. Each metal flange in accordance with one embodiment of this invention further comprises a plurality of ribs 20, 21, 22, in the centralized active region, forming a plurality of reactant compartments 25, 26, 27 between the metal flanges and the fuel cell unit on both sides of the fuel cell unit. In accordance with one embodiment of this invention, both the cathode electrode 16 and the anode electrode 13 are contained within the interior space surrounded by the peripheral wet seal structures 23, 24, thereby preventing gas flow beyond the peripheral edges of the electrodes. Preferably, the cathode electrode 16 is disposed below the electrolyte layer 15, which is adjacent to the cathode electrode, and is supported on a perforated metal cathode current collector 17. A nickel mesh 14 is disposed adjacent to the electrolyte layer 15 and contacts the ribs 20 of the anode electrode metal flange 11 to serve as an anode current collector.

Figure 2:
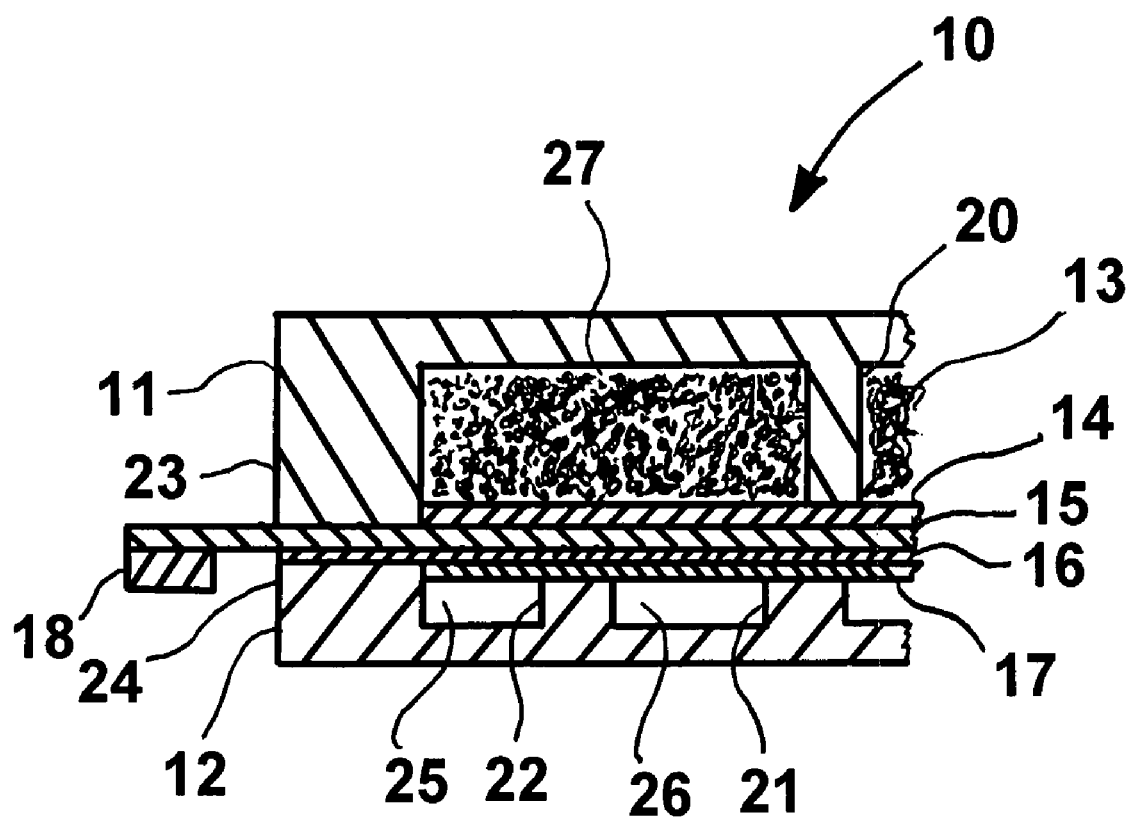
FIG. 2 is a lateral cross-sectional view of a peripheral region of a direct carbon fuel cell in accordance with another embodiment of this invention.

FIG. 2 shows one embodiment of this invention in which the cathode electrode 16 extends beyond the interior space formed by the peripheral wet seal structures. In this instance, the wet seal on the cathode side of the fuel cell unit is formed by the wet seal structure 24 with the cathode electrode 16.

Electrolyte layer 15 comprises an alkali metal carbonates electrolyte disposed within a porous electrolyte matrix. The porous electrolyte matrix in accordance with one embodiment of this invention is a porous lithium aluminate ($LiAlO_2$) matrix and the molten carbonates electrolyte is maintained within the porous network of the matrix by virtue of capillarity.

Figure 4:
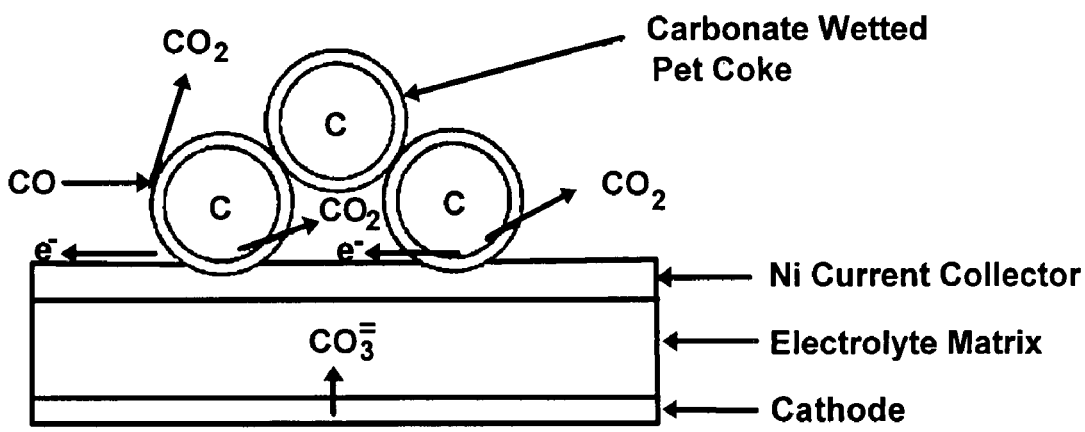
FIG. 4 is a schematic diagram illustrating the concept of the direct coal fuel cell of this invention.

The crux of this invention lies in the anode electrode of the fuel cell, which anode electrode comprises a loose pack of carbon particles pre-wetted with carbonate. The pack is in contact with the electrolyte layer and forms a porous network of percolated (continuous) particles. As used herein, the term "pre-wetted" refers to carbon particles having a dried carbonate outer shell as shown in FIG. 4. A method for pre-wetting the carbon particles is described in more detail herein below.

Figure 5:
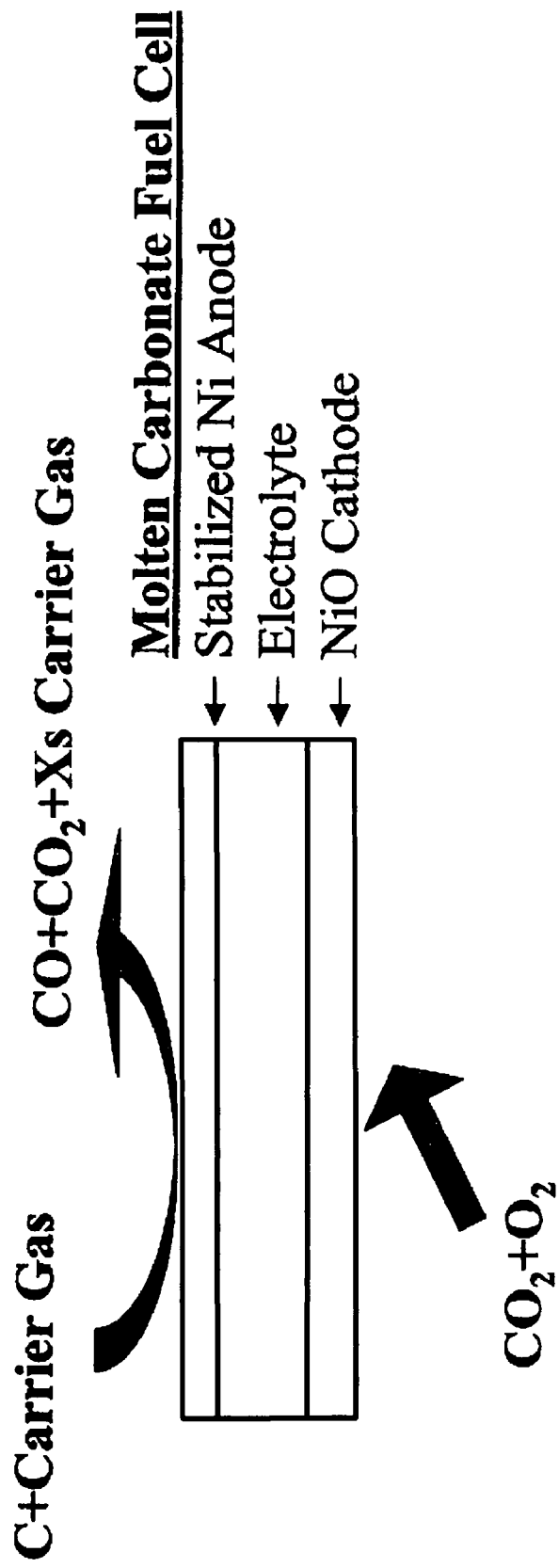
FIG. 5 is another diagram showing the concept of this invention.

The electrochemical process of generating electricity using the direct carbon fuel cell of this invention is shown in FIGS. 4 and 5. As shown therein, carbonate ions ($CO_3^=$) are generated at the cathode by the reaction between $CO_2$ and $O_2$ from the oxidant gas and electrons from an external circuit. The reaction is:

$$2CO_2 + O_2 + 4e^- \rightarrow 2CO_3^=$$

The carbonate ions are transported through the carbonate-filled $LiAlO_2$ matrix to the anode. $CO_2$ is introduced into the anode as a carrier of carbon. Upon heating, a portion of the $CO_2$ is partially reduced to $CO$. In the anode, both $CO$ and carbon are oxidized in accordance with the following reactions:

$$CO + CO_3^= \rightarrow 2CO_2 + 2e^-$$

and $$C + 2CO_3^= \rightarrow 3CO_2 + 4e^-$$

Thus, the combined reactions for the direct carbon fuel cell of this invention are:

$$CO + \tfrac{1}{2}O_2 \rightarrow CO_2$$

and $$C + O_2 \rightarrow CO_2$$

As previously indicated, the anode is a pack of pre-wetted carbon particles. As the carbon is consumed, carbonate is left to accumulate in the fuel cell. If the accumulated carbonate is not removed, the electrolyte matrix and the cathode electrode will become flooded, thereby impeding the cathode reaction. Accordingly, in accordance with one embodiment of this invention, to remove the excess carbonate, an external wicking material 18, as shown in FIG. 1, is connected with the portion of the electrolyte matrix extending beyond the periphery of the anode and cathode metal flanges. The wicking material is a melt adsorbent by virtue of capillary action or a melt draining material by virtue of melt creepage. It is maintained at a temperature above the liquidus temperature of the carbonate electrolyte and, in accordance with one preferred embodiment of this invention, is connected with the electrolyte matrix oriented in a manner which permits molten carbonate in the wicking material to drip from the wicking material for collection, such as in a metal trough, e.g. Ag or stainless steel foil. By wicking away the carbonate melt left by the carbon, a good balance of carbonate filling in the active cell components is maintained. With a porous pack of pre-wetted carbon as the anode, the network of empty voids in the anode allows for efficient removal of the $CO_2$ gas, which translates to a higher fuel cell performance.

Figure 3:
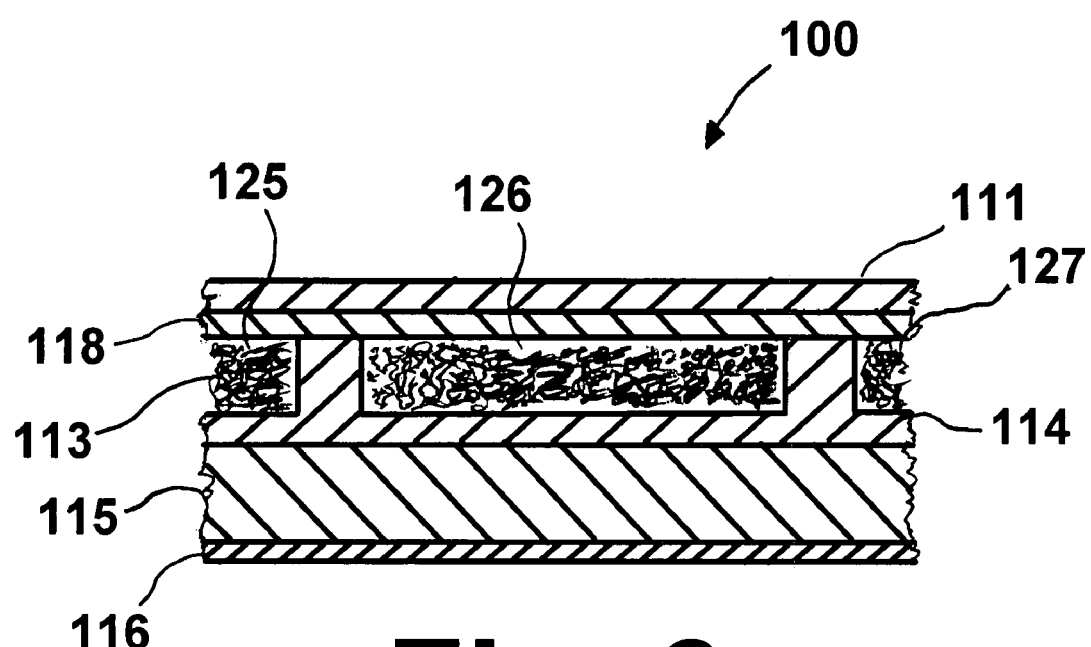
FIG. 3 is a lateral cross-sectional view of a portion of a direct carbon fuel cell in accordance with one embodiment of this invention.

FIG. 3 shows a direct carbon fuel cell 100 in accordance with one embodiment of this invention comprising cathode electrode 116 and anode electrode 113 in which the metal flange 111 on the anode side of the fuel cell is a flat plate. In this embodiment, the anode current collector 114 is a porous ribbed structure disposed adjacent to electrolyte layer 115 and forming a plurality of reaction compartments 125, 126, 127 in which are disposed pre-wetted carbon particles of anode electrode 113. As a result, excess carbonate generated during operation of the fuel cell is able to flow through the porous anode current collector into wicking material 118 which extends beyond the periphery of the fuel cell to enable draining of the excess carbonate.

To produce the carbon anode used in the fuel cell of this invention, carbon is soaked in an alkaline solution containing cations having a ratio similar to that in the fuel cell electrolyte. The wetted carbon is then dried and subjected to a flow of ambient $CO_2$ in a container. The alkalis are carbonated with the liberation of heat and water. The pre-wetted carbon is then fluidized using $CO_2$ and introduced into a heated chamber with catalysts suitable for partially converting the $CO_2$ to CO by the Boudouard reaction:

$$C+CO_2 \rightarrow 2CO$$

CO is also a fuel, which may be more reactive than carbon and, thus, could facilitate the anode reaction. The fluidized carbon, CO and $CO_2$ mixture is then pneumatically introduced to the fuel cell anode. The electrolyte coating on the carbon provides a path for the ionic transport of $CO_3^=$ species to the carbon reactant.

In accordance with one embodiment of this invention as shown in FIG. 5, fine carbon particles are transported to the fuel cell anode with the aid of a carrier gas. Suitable carrier gases include, but are not limited to $CO_2$, steam ($H_2O$) and inert gases, such as nitrogen. If $CO_2$ and/or $H_2O$ are used as the carrier gas, they may also provide additional functionality in the form of partial conversion of the carbon to CO for enhanced electrochemical reactions in accordance with the following reactions:

$$C\text{---Steam Reaction: } C+H_2O \rightarrow H_2+CO$$

$$C\text{---}CO_2 \text{ Reaction: } C+CO_2 \rightarrow 2CO$$

$$DCFC \text{ Anode Reaction: } CO+CO_3^= \rightarrow 2CO_2+2e^-$$

Introduction of the reactants to the fuel cell may be by means of internal or external manifolds, designs for which are described in the literature. Internal manifolding, for example, is taught by U.S. Pat. No. 4,963,442.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. In a direct carbon fuel cell having an anode electrode, a cathode electrode, and an electrolyte disposed between said anode electrode and said cathode electrode, the improvement comprising:
    said anode electrode comprising carbon particles pre-wetted with carbonate; and
    said electrolyte comprising molten carbonate disposed within a porous electrolyte matrix.

2. The direct carbon fuel cell of claim 1 further comprising a wicking material suitable for adsorbing molten carbonate, said wicking material in fluid communication with said porous electrolyte matrix.

3. The direct carbon fuel cell of claim 2, wherein said anode electrode, cathode electrode, and said electrolyte are disposed between two metal flanges having a centralized active region and a peripheral sealing region.

4. The direct carbon fuel cell of claim 3, wherein said peripheral sealing region of each said metal flange comprises a raised peripheral wet seal structure which forms a peripheral wet seal with at least one of said cathode electrode and said porous electrolyte matrix.

5. The direct carbon fuel cell of claim 4, wherein said centralized region of at least one of said metal flanges comprises a plurality of raised ribs, forming a plurality of reactant compartments between said at least one metal flange and said matrix on at least one side of said matrix.

6. The direct carbon fuel cell of claim 4, wherein a portion of said matrix extends beyond a peripheral edge of said metal flanges and said wicking material is connected with said portion of said matrix.

7. The direct carbon fuel cell of claim 3, wherein said cathode electrode is supported on a perforated metal current collector plate.

8. The direct carbon fuel cell of claim 3 further comprising an anode current collector disposed on an anode facing side of said matrix.

9. The direct carbon fuel cell of claim 1, wherein said pre-wetted carbon particles are loosely packed, forming a porous network.

10. A method for electrochemically generating electricity comprising the steps of:
    introducing a mixture of carbon particles pre-wetted with carbonate, carbon monoxide, and carbon dioxide at a temperature greater than about 600° C. into an anode side of a molten carbonate fuel cell;
    introducing an oxidizing gas into a cathode side of said molten carbonate fuel cell, forming carbonate ions; and
    transporting said carbonate ions through a molten carbonate electrolyte of said molten carbonate fuel cell to said anode side, whereby said carbon monoxide and carbon particles are oxidized, thereby generating electricity.

11. The method of claim 10, wherein excess carbonate on said anode side is removed from said molten carbonate fuel cell by a carbonate adsorbent wick in fluid communication with said anode side.

12. The method of claim 11, wherein said wick is at a temperature above a liquidus temperature of said carbonate.

13. The method of claim 10, wherein said molten carbonate fuel cell is at an operating temperature in a range of about 600° C. to 950° C.

14. The method of claim 10, wherein said pre-wetted carbon particles are produced by soaking carbon particles in an alkaline solution containing cations, producing wetted carbon particles, drying said wetted carbon particles, producing dried carbon particles, contacting said dry carbon particles with carbon dioxide, thereby carbonating alkalis and liberating heat and water, forming said pre-wetted carbon particles.

15. The method of claim 14, wherein said pre-wetted carbon particles are fluidized using carbon dioxide and heated in the presence of a catalyst, partially converting said carbon dioxide to carbon monoxide by the Boudouard reaction, thereby forming said mixture.

16. In a molten carbonate fuel cell comprising an anode electrode, a cathode electrode, an electrolyte matrix containing at least one molten carbonate disposed between said anode electrode and said cathode electrode, the improvement comprising:

said anode electrode comprising a plurality of carbon particles pre-wetted with carbonate.

17. The molten carbonate fuel cell of claim 16 further comprising a wicking material suitable for adsorbing molten carbonate, said wicking material in fluid communication with said electrolyte matrix.

18. The molten carbonate fuel cell of claim 17, wherein said anode electrode, cathode electrode, and said electrolyte are disposed between two metal flanges having a centralized active region and a peripheral sealing region.

19. The molten carbonate fuel cell of claim 18, wherein said peripheral sealing region of each said metal flange comprises a raised peripheral wet seal structure which forms a peripheral wet seal with at least one of said cathode electrode and said porous electrolyte matrix and said centralized region of at least one of said metal flanges comprises a plurality of raised ribs, forming a plurality of reactant compartments between said at least one metal flange and said porous electrolyte matrix on at least one side of said matrix.

20. The molten carbonate fuel cell of claim 17, wherein a portion of said porous electrolyte matrix extends beyond a peripheral edge of said metal flanges and said wicking material is connected with said portion of said matrix.

* * * * *